United States Patent
Pintauro (10) Patent No.: US 11,020,939 B2
(45) Date of Patent: Jun. 1, 2021

(54) NANOFIBER ELECTRODES, FABRICATING METHODS AND APPLICATIONS OF SAME

(71) Applicant: VANDERBILT UNIVERSITY, Nashville, TN (US)

(72) Inventor: Peter N. Pintauro, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 16/764,504

(22) PCT Filed: Nov. 16, 2018

(86) PCT No.: PCT/US2018/061434
§ 371 (c)(1),
(2) Date: May 15, 2020

(87) PCT Pub. No.: WO2019/099772
PCT Pub. Date: May 23, 2019

(65) Prior Publication Data
US 2020/0353719 A1  Nov. 12, 2020

Related U.S. Application Data

(63) Continuation-in-part of application No. 16/064,137, filed on Jun. 20, 2018, and a continuation-in-part of
(Continued)

(51) Int. Cl.
*H01M 4/86* (2006.01)
*B32B 13/02* (2006.01)

(52) U.S. Cl.
CPC .......... *B32B 13/02* (2013.01); *H01M 4/8652* (2013.01); *H01M 4/8663* (2013.01); *H01M 4/8657* (2013.01)

(58) Field of Classification Search
CPC .................................................. H01M 4/8652
See application file for complete search history.

(56) References Cited

U.S. PATENT DOCUMENTS 4,959,132 A * 9/1990 Fedkiw, Jr. ......... H01M 8/1004
205/344
2013/0096215 A1* 4/2013 Koestner ................ C09D 11/52
521/28
(Continued)

FOREIGN PATENT DOCUMENTS

WO    2012174463 A1    12/2012

OTHER PUBLICATIONS

United States Patent and Trademark Office (ISR/US), "International Search Report for PCT/US2018/061434", US, dated Mar. 8, 2019.

*Primary Examiner* — Brian R Ohara
(74) *Attorney, Agent, or Firm* — Locke Lord LLP; Tim Tingkang Xia, Esq.

(57) ABSTRACT

Nanofiber electrodes for electrochemical devices and fabricating methods of the same are disclosed. In one embodiment, the method includes forming a liquid mixture containing a catalyst, a first polymer of perfluoro sulfonic acid and a second polymer of polyethylene oxide, the first polymer of perfluoro sulfonic acid being pre-treated to remove protons in the first polymer by exchange with a cation species like Na+; and electro spinning the liquid mixture to generate electro spun fibers and deposit the generated fibers on a collector substrate to form a fiber electrode mat comprising a network of fibers, where each fiber has a plurality of particles of the catalyst distributed thereon.

15 Claims, 5 Drawing Sheets

Related U.S. Application Data application No. 15/764,481, filed on Mar. 29, 2018, and a continuation-in-part of application No. 15/867,060, filed on Jan. 10, 2018, now abandoned, and a continuation-in-part of application No. 15/511,709, filed on Mar. 16, 2017, and a continuation-in-part of application No. 15/161,838, filed on May 23, 2016, now Pat. No. 10,141,593.

(60) Provisional application No. 62/586,946, filed on Nov. 16, 2017.

(56) References Cited

U.S. PATENT DOCUMENTS

| | | |
|---|---|---|
| 2013/0209913 A1 | 8/2013 | Pintauro et al. |
| 2014/0038076 A1* | 2/2014 | Pintauro ................... B32B 5/08 |
| | | 429/480 |
| 2014/0051013 A1 | 2/2014 | Elabd et al. |
| 2014/0349213 A1 | 11/2014 | Pintauro et al. |

* cited by examiner

NANOFIBER ELECTRODES, FABRICATING METHODS AND APPLICATIONS OF SAME

CROSS-REFERENCE TO RELATED PATENT APPLICATIONS

This application claims priority to and the benefit of U.S. provisional patent application No. 62/586,946, filed Nov. 16, 2017.

This application also is a continuation-in-part application of U.S. patent application Ser. No. 16/064,137, filed Jun. 20, 2018.

This application also is a continuation-in-part application of U.S. patent application Ser. No. 15/764,481, filed Mar. 29, 2018.

This application also is a continuation-in-part application of U.S. patent application Ser. No. 15/867,060, filed Jan. 10, 2018.

This application also is a continuation-in-part application of PCT patent application No. PCT/US2017/034162, filed May 24, 2017.

This application also is a continuation-in-part application of U.S. patent application Ser. No. 15/511,709, filed Mar. 16, 2017.

This application also is a continuation-in-part application of U.S. patent application Ser. No. 15/161,838, filed May 23, 2016.

All of the above-identified disclosures are incorporated herein by reference in their entireties.

STATEMENT AS TO RIGHTS UNDER FEDERALLY-SPONSORED RESEARCH

This invention was made with government support under Contract No. DE-EE0007653 awarded by the Department of Energy. The government has certain rights in the invention.

FIELD OF THE INVENTION

The present invention relates generally to the field of materials, and more specifically related to fuel cell fiber electrodes, fabricating methods and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

There has been considerable research over the past years on electrodes for fuel cells, particularly on nanofiber cathodes for the fuel cells. Unusually, Nafion® or some other perfluorosulfonic acid is used as a binder in the nanofiber cathodes and anodes. Nafion® forms a micellar dispersion in electrode inks and the electrode inks will only form electrosprayed droplets unless a carrier polymer is added to the ink mixture. To successfully fabricate the nanofiber cathodes with an electrospinning process, a carrier polymer, such as poly(acrylic acid) (PAA), is required. However, PAA has drawbacks: (i) the addition of PAA to Nafion® lowers the proton conductivity of the binder and makes the binder more hydrophilic, which promotes electrode flooding, (ii) PAA cannot be completely removed from a fiber mat cathode after electro spinning, and (iii) there may be issues of the long-term stability of PAA in a fuel cell cathode.

To electrospin perfluorosulfonic acids ionomer fibers, such as Nafion® or Aquivion® (with no catalyst), the preferred carrier polymer is polyethylene oxide (PEO) because it is effective at low concentrations (less than 5 wt %) and it can easily be removed after electrospinning by soaking in hot water. However, PEO decomposes in a cathode ink mixture containing Nafion® ionomer and catalyst powder where degradation is noted as a significant drop in the viscosity of the ink after stirring for some period of time (e.g., 1-2 hours), and thus is ineffective as a carrier polymer. When catalyst, PFSA in the acid counterion form, and PEO are mixed as an electrospinning ink, the ink mixture often bubbles and the temperature of the ink mixture rises, indicating an exothermic reaction. The resulting ink does not produce nanofibers during an electrospinning experiment; for all electrospinning conditions examined (e.g., applied voltage, ink flow rate, etc.), only sprayed droplets are deposited on the collection surface during an electrospinning experiment. Based on these results, it is concluded that a reaction occurred during ink preparation with PEO carrier polymer; where said reaction prevented the ink from forming fibers during spinning/electro spinning.

Therefore, a heretofore unaddressed need exists in the art to address the aforementioned deficiencies and inadequacies.

SUMMARY OF THE INVENTION

In one aspect, the invention relates to a method of forming a fiber electrode for an electrochemical device, such as a fuel cell. In one embodiment, the method includes forming a liquid mixture containing a catalyst, a first polymer of perfluorosulfonic acid (PFSA) and a second polymer of polyethylene oxide (PEO), where the first polymer of PFSA is pre-treated to exchange protons in the first polymer with $Na^+$ cations or ammonium cations or some cation other than a proton; and electrospinning the liquid mixture to generate electro spun fibers and deposit the generated fibers on a collector substrate to form a fiber electrode comprising a network of fibers, where each fiber has a plurality of particles of the catalyst distributed thereon.

In one embodiment, the method further includes soaking the fiber electrode in water to remove PEO and/or in an aqueous acid solution to exchange $H^+$ for $Na^+$ while removing/dissolving/decomposing PEO.

In one embodiment, the catalyst includes platinum (Pt) particles, Pt alloy particles, Pt on carbon particles, Pt alloy on carbon particles, silver (Ag) particles, Ag alloy particles, nickel (Ni) particles, Ni alloy particles, iron (Fe) particles, Fe alloy particles, palladium (Pd) particles, Pd alloy particles, core-shell catalyst particles, non-Pt group metal (PGM) fuel cell catalysts, or a combination thereof. In one embodiment, the catalyst includes Pt/C, PtCo/C, or PtNi/C.

In one embodiment, the first polymer of PFSA is pre-treated by soaking dry PFSA powders in an aqueous alkali metal chloride solution or an alkaline earth cation salt solution, or a multivalent cation salt solution for a period of time followed by numerous washings with DI water during filtration, and then polymer drying. In one embodiment, the PFSA polymer is Nafion® (1100 EW PFSA) or Aquivion® or a low (725) EW PFSA.

In one embodiment, ratios between the catalyst, the first polymer and the second polymer in the fiber electrode are about 55:35:10 wt %, or 53:36:11 wt %.

In another aspect, the invention relates to a membrane-electrode-assembly (MEA) for an electrochemical device, such as a fuel cell. In one embodiment, the MEA has an anode, a cathode and a membrane disposed between the anode and the cathode, where at least one of the cathode and the anode is formed of a fiber electrode comprising a network of fibers formed by electro spinning a liquid mixture containing a catalyst, a first polymer of PFSA and a second polymer of PEO, where the first polymer of PFSA is pre-treated to exchange protons in the first polymer with $Na^+$ cations, $Li^+$ cations, $Cs^+$ cations, or ammonium cations.

In one embodiment, the catalyst includes Pt particles, Pt alloy particles, Pt on carbon particles, Pt alloy on carbon particles, Ag particles, Ag alloy particles, Ni particles, Ni alloy particles, Fe particles, Fe alloy particles, Pd particles, Pd alloy particles, core-shell catalyst particles, non-Pt group metal fuel cell catalysts, or a combination thereof. In one embodiment, the catalyst includes Pt/C, PtCo/C, or PtNi/C.

In one embodiment, the first polymer of PFSA is pre-treated by soaking dry PFSA powders in an aqueous alkali metal chloride solution or an alkaline earth cation salt solution, or a multivalent cation salt solution for a period of time followed by numerous washings with DI water during filtration, and then polymer drying. In one embodiment, the PFSA polymer is Nafion® (1100 EW PFSA) or Aquivion® or a low (725) EW PFSA.

In one embodiment, ratios between the catalyst, the first polymer and the second polymer in the fiber electrode are about 55:35:10 wt %, or 53:36:11 wt %.

In one embodiment, the fiber electrode is soaked in water to remove PEO and/or in an aqueous acid solution to exchange $H^+$ for $Na^+$ while removing/decomposing PEO.

In one embodiment, the membrane is formed of Nafion®.

In one embodiment, when the cathode is formed of the fiber electrode, the anode includes a fiber mat formed by electro spinning a solution containing a catalyst of Pt/C, a binder polymer of Nafion® and a carrier polymer of PAA or PVDF.

In yet another aspect, the invention relates to a method of forming a fiber electrode for an electrochemical device. In one embodiment, the method includes forming a liquid mixture containing a catalyst, a first polymer and a second polymer; where the first polymer is pre-treated to exchange protons in the first polymer with $Na^+$ cations or ammonium cations; and electro spinning the liquid mixture to generate electro spun fibers and deposit the generated fibers on a collector substrate to form a fiber electrode comprising a network of fibers, where each fiber has a plurality of particles of the catalyst distributed thereon.

In one embodiment, the method further includes soaking the fiber electrode in water to remove the second polymer and/or in an aqueous acid solution to exchange $H^+$ for $Na^+$ while removing/decomposing the second polymer.

In one embodiment, the catalyst includes Pt particles, Pt alloy particles, Pt on carbon particles, Pt alloy on carbon particles, Ag particles, Ag alloy particles, Ni particles, Ni alloy particles, Fe particles, Fe alloy particles, Pd particles, Pd alloy particles, core-shell catalyst particles, non-Pt group metal fuel cell catalysts, or a combination thereof. In one embodiment, the catalyst includes Pt/C, PtCo/C, or PtNi/C.

In one embodiment, the first polymer of PFSA is pre-treated by soaking dry PFSA powders in an aqueous alkali metal chloride solution or an alkaline earth cation salt solution, or a multivalent cation salt solution for a period of time followed by numerous washings with DI water during filtration, and then polymer drying. In one embodiment, the PFSA polymer is Nafion® (1100 EW PFSA) or Aquivion®.

In one embodiment, the PFSA is a 725 equivalent weight (EW) ionomer.

In one embodiment, the second polymer includes an oligomer or polymer of ethylene oxide, such as PEG or PEO, or some other uncharged polymer such as POE or PVA or PVP.

In one embodiment, ratios between the catalyst, the first polymer and the second polymer in the fiber electrode are about 55:35:10 wt %, or 53:36:11 wt %.

In a further aspect, the invention relates to an MEA for an electrochemical device. In one embodiment, the MEA has an anode, a cathode and a membrane disposed between the anode and the cathode, where at least one of the cathode and the anode is formed of a fiber electrode comprising a network of fibers formed by electro spinning a liquid mixture containing a catalyst, a first polymer and a second polymer, where the first polymer is pre-treated to exchange protons in the first polymer with $Na^+$ cations or ammonium cations.

In one embodiment, the catalyst includes Pt particles, Pt alloy particles, Pt on carbon particles, Pt alloy on carbon particles, Ag particles, Ag alloy particles, Ni particles, Ni alloy particles, iron (Fe) particles, Fe alloy particles, Pd particles, Pd alloy particles, core-shell catalyst particles, non-Pt group metal fuel cell catalysts, or a combination thereof. In one embodiment, the catalyst includes Pt/C, PtCo/C, or PtNi/C.

In one embodiment, the first polymer includes PFSA, and is pre-treated by soaking dry PFSA powders in an aqueous alkali metal chloride solution or an alkaline earth cation salt solution, or a multivalent cation salt solution for a period of time followed by numerous washings with DI water during filtration, and then polymer drying. In one embodiment, the PFSA polymer is Nafion® or Aquivion® or 725 EW PFSA.

In one embodiment, the second polymer includes an oligomer or polymer of ethylene oxide, such as PEG, PEO, or POE or PVA or PVP.

In one embodiment, ratios between the catalyst, the first polymer and the second polymer in the fiber electrode are about 55:35:10 wt %, or 53:36:11 wt %.

In one embodiment, the fiber electrode is soaked in water to remove the second polymer and/or in an aqueous acid solution to exchange $H^+$ for $Na^+$ while removing/decomposing second polymer.

In one embodiment, the membrane is formed of Nafion®.

In one embodiment the membrane is Nafion or some other PFSA that is mechanically reinforced by uncharged fibers.

In one embodiment, when the cathode is formed of the fiber electrode, the anode includes a fiber mat formed by electrospinning a solution containing a catalyst of Pt/C, a binder polymer of Nafion® and a carrier polymer of PAA or PVDF.

In one embodiment, the anode includes a fiber mat formed by electrospinning a solution containing a catalyst of Pt/C, a binder polymer of Nafion® with the $H^+$ counterions exchanged with $Na^+$ and a carrier polymer of PEO.

In one aspect, the invention relates to an MEA for an electrochemical device. In one embodiment, the MEA has an anode, a cathode and a membrane disposed between the anode and the cathode, where the cathode and/or anode comprise a network of fibers formed by electrospinning, wherein the fibers contain catalyst particles and a charged polymer.

In one embodiment, the charged polymer is a PFSA ionomer or a mixture of two or more PFSA ionomers.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE INVENTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the phrase "at least one of A, B, and C" should be construed to mean a logical (A or B or C), using a non-exclusive logical OR. As used herein, the term "and/or" includes any and all combinations of one or more of the associated listed items.

As used herein, the term "conducting polymer" or "ionomer" generally refers to a polymer that conducts ions. More precisely, the ionomer refers to a polymer that includes repeat units of at least a fraction of ionized units. As used herein, the term "polyelectrolyte" generally refers to a type of ionomer, and particularly a polymer whose repeating units bear an electrolyte group, which will dissociate when the polymer is exposed to aqueous solutions (such as water), making the polymer charged. The conducting polymers, ionomers and polyelectrolytes may be generally referred to as "charged polymers". As used herein, the terms "polyelectrolyte fiber" or "charged polymer fiber" generally refer to the polymer fiber formed by polyelectrolytes or the likes. As used herein, polyelectrolyte, ionomer, and charged polymer can be used interchangeably.

As used herein, the terms "uncharged polymer" or "uncharged (or minimally charged) polymer" generally refer to the polymer that does not effectively conduct ions, particularly to the polymer whose repeating units do not bear a charged electrolyte group or bear a small number of electrolyte groups, and thus the polymer will not be charged or will have a very small charge when being exposed to aqueous solutions. As used herein, the terms "uncharged polymer fiber" or "uncharged (or minimally charged) polymer fiber" generally refer to the polymer fiber formed by the uncharged/uncharged (or minimally charged) polymer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Figure 1:
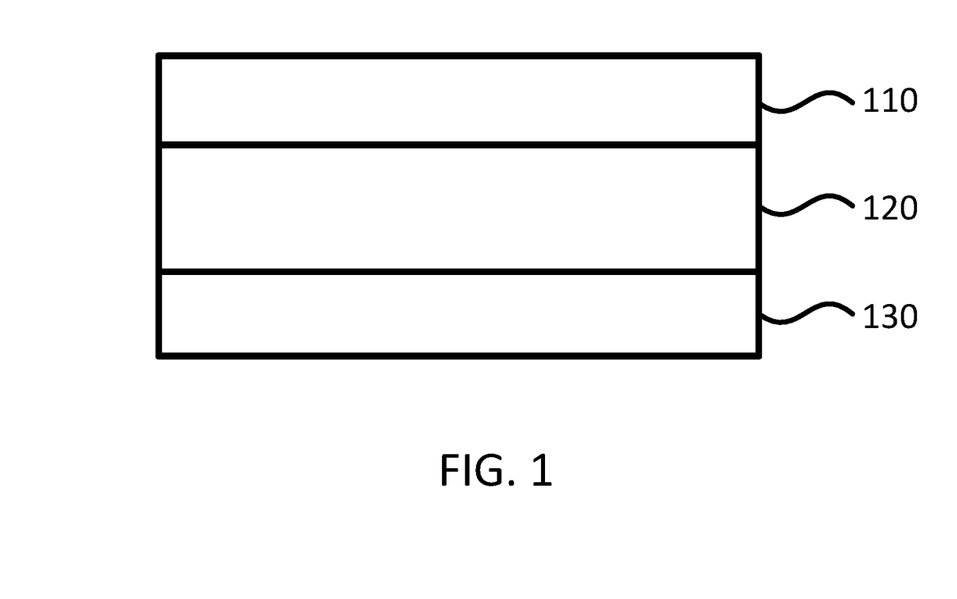
FIG. 1 shows schematically a membrane-electrode-assembly (MEA) for an electrochemical device according to one embodiment of the invention.

In one aspect, this invention relates to nanofiber electrodes used in membrane-electrode-assemblies (MEAs) for electrochemical devices. FIG. 1 shows an MEA according to one embodiment of the present invention. The MEA may be incorporated into an electrochemical device, for example a fuel cell. Those skilled in the art will recognize that in a typical fuel cell, a MEA has two electrodes, an anode and a cathode. In the exemplary embodiment shown in FIG. 1, the MEA has a cathode 110, an anode 130 and a membrane 120 disposed between the cathode 110 and the anode 130.

In certain embodiments, the cathode 110 and/or the anode 130 are formed of a nanofiber electrode including a network of fibers formed by electrospinning a liquid mixture containing a catalyst, a first polymer and a second polymer. In certain embodiments, the first polymer includes perfluorosulfonic acid (PFSA) or Nafion®. When PFSA or Nafion® is used as the binder, a carrier polymer must be added in order to electrospin fibers. To date, that carrier polymer was either poly(acrylic acid) (PAA) or polyvinylidene fluoride (PVDF). Both PAA and PVDF suppress the proton conductivity of Nafion®, thus lowering the power output of the fuel cell. The preferred carrier polymer is polyethylene oxide (PEO) because it is effective at low concentrations (less than 5 wt %) and it can easily be removed after electrospinning by soaking in hot water. However, PEO decomposes in a cathode ink mixture containing Nafion® ionomer and catalyst powder where degradation is noted as a significant drop in the viscosity of the ink after stirring for some period of time (for example, about 0.5-6 hours), and thus is ineffective as a carrier polymer. In other words, in the past, polyethylene oxide (PEO) could not be used with Nafion®, when Nafion® was in the acid form ($H^+$ counter-ion form) and there was no catalyst particles present. To utilize the second polymer of PEO as a carrier polymer in the presence of a catalyst powder, according to the present invention, the first polymer e.g., PFSA or Nafion®, needs to be pre-treated first to remove $H^+$ (acid moieties) and replace/exchange them in the first polymer with an alkali metal cation such as $Na^+$, or ammonium cations, or some other monovalent or divalent cation species. Specifically, we now remove the protons from Nafion® and exchange them with another cation ($Na^+$ or ammonium cations), which makes now PEO be used as a carrier for nanofiber electrode electrospinning. In addition, PEO can be removed from the fiber electrode (cathode 110) after the fiber electrode is formed (noting that PAA could not be removed from the fiber electrode) and more power is generated in a fuel cell. Therefore, electrospinning fiber electrodes formed with Nafion® and PEO works better, in terms of fuel cell power output during the initial operation of fuel cell operations, than that formed with Nafion® and PAA. That is, when Nafion® and PEO are used as the binder in an electrospun fuel cell cathode, higher power densities are realized. The durability of fuel cell electrodes with Nafion® and PEO may be better that that with Nafion® and PAA as well, which will be fully assessed in the future.

According to embodiments of the present invention, when Nafion® and PEO are mixed with Pt/C catalyst powder to form an electrospinning ink, the PEO polymer decomposes, as evidence by a dramatic decrease in the viscosity of the ink over a period of just a few hours. It was assumed that this decomposition occurred due to the combined effects of the very high acidity of the Nafion® polymer, with sulfonic acid on-exchange sites and the presence of catalyst particles. In one embodiment, by soaking Nafion® polymer in a NaCl solution, the $H^+$ ions associated with sulfonate sites are exchanged by $Na^+$, where NaCl represents a 1:1 ratio of sodium and chloride ions. Thus, the Nafion® polymer is no longer in the acid form, and there is no decomposition of PEO in the ink.

In certain embodiments, the PFSA polymer is pre-treated by soaking dry PFSA powders in an aqueous alkali metal chloride solution or an alkaline earth cation salt solution, or a multivalent cation salt solution for a period of time followed by numerous washings with DI water during filtration, and then polymer drying. In one embodiment, the PFSA polymer is Nafion® or Aquivion® or 725 EW PFSA.

In certain embodiments, the second polymer includes an oligomer or polymer of ethylene oxide, e.g., PEG, PEO, or some other uncharged polymer such as POE, PVA, or PVP.

In certain embodiments, the catalyst includes Pt particles, Pt alloy particles, Pt on carbon particles, Pt alloy on carbon particles, Ag particles, Ag alloy particles, Ni particles, Ni alloy particles, iron (Fe) particles, Fe alloy particles, Pd particles, Pd alloy particles, core-shell catalyst particles, non-Pt group metal fuel cell catalysts, or a combination thereof. In certain embodiments, the catalyst includes Pt/C, PtCo/C, or PtNi/C.

Furthermore, optimization of the amount of PEO and identification of other counter-ion forms of Nafon® which work better, and also accelerated electrode durability are performed. In certain embodiments, ratios between the catalyst, the first polymer and the second polymer in the cathode are about 55:35:10 wt %, or 53:36:11 wt %.

In certain embodiments, the nanofiber electrode is soaked in water to remove the second polymer and/or in an aqueous acid solution to exchange $H^+$ for $Na^+$ while removing/decomposing second polymer.

In certain embodiments, the membrane 130 is formed of Nafion®.

In certain embodiments, when the cathode 110 is formed of the nanofiber electrode, the anode 120 includes a fiber mat formed by electrospinning a solution containing a catalyst of Pt/C, a binder polymer of Nafion® and a carrier polymer of PAA or PVDF.

In certain embodiments, the anode 120 includes a fiber mat formed by electrospinning a solution containing a catalyst of Pt/C, a binder polymer of Nafion® in the $Na^+$ counterion form and a carrier polymer of PEO.

Figure 2:
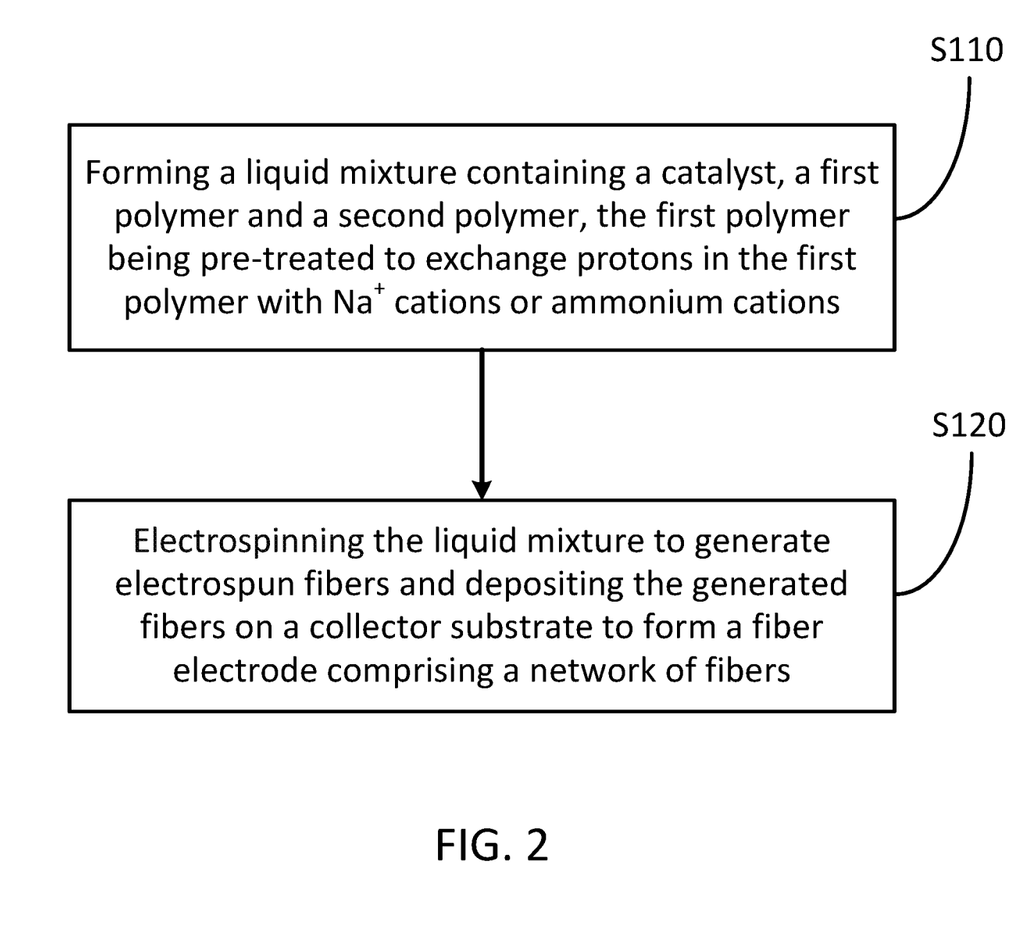
FIG. 2 shows schematically a flowchart of forming a fiber electrode for an MEA according to one embodiment of the invention.

Referring now to FIG. 2, a method for fabricating a fiber electrode for a fuel cell is schematically shown according to one embodiment of the present invention. The method includes the following steps.

At step S110, a liquid mixture containing a catalyst, a first polymer and a second polymer is formed, where the first polymer is pre-treated to exchange protons in the first polymer with $Na^+$ cations or ammonium cations.

In one embodiment, the first polymer includes PFSA, and is pre-treated by soaking dry PFSA powders in an aqueous alkali metal chloride solution or an alkaline earth cation salt solution, or a multivalent cation salt solution for a period of time followed by numerous washings with DI water during filtration, and then polymer drying. In one embodiment, the PFSA polymer is Nafion® or Aquivion® or 725 EW PFSA.

In certain embodiments, the second polymer includes an oligomer or polymer of ethylene oxide, for example, PEG, PEO, or some other uncharged polymer such as POE, PVA, or PVP.

In certain embodiments, the catalyst includes Pt particles, Pt alloy particles, Pt on carbon particles, Pt alloy on carbon particles, Ag particles, Ag alloy particles, Ni particles, Ni alloy particles, Fe particles, Fe alloy particles, Pd particles, Pd alloy particles, core-shell catalyst particles, non-Pt group metal fuel cell catalysts, or a combination thereof. In one embodiment, the catalyst includes Pt/C, PtCo/C, or PtNi/C.

In certain embodiments, ratios between the catalyst, the first polymer and the second polymer in the fiber electrode are about 55:35:10 wt %, or 53:36:11 wt %.

At step S120, the liquid mixture is electro spun to generate fibers and the generated fibers are deposited on a collector substrate to form a fiber electrode comprising a network of fibers, where each fiber has a plurality of particles of the catalyst distributed thereon.

In certain embodiments, the method further includes soaking the fiber electrode in water to remove the second polymer and/or in an aqueous acid solution to exchange $H^+$ for $Na^+$ while removing/decomposing the second polymer.

In one aspect, the invention relates to an MEA for an electrochemical device. In one embodiment, the MEA has an anode, a cathode and a membrane disposed between the anode and the cathode, where the cathode and/or anode comprise a network of fibers formed by electrospinning, wherein the fibers contain catalyst particles and a charged polymer.

In one embodiment, the charged polymer is a PFSA ionomer or a mixture of two or more PFSA ionomers.

These and other aspects of the present invention are further described in the following section. Without intending to limit the scope of the invention, further exemplary implementations of the present invention according to the embodiments of the present invention are given below. Note that titles or subtitles may be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

Electrospun Fiber Cathodes with Binder of Nafion® and PEO

According to the present invention, PEO decomposition in the presence of catalyst powders is acid-catalyzed. In this exemplary example, to eliminate degradation of PEO in a Nafion®/catalyst electrode ink, acid-form Nafion® was replaced by Nafion® in the $Na^+$ counter-ion form. This was accomplished by soaking dry Nafion® powders in an aqueous 1.0 M NaCl solution for about 24 hours followed by numerous washings with DI water during filtration, and then polymer drying. Ink preparation was carried out normally: catalyst and water was mixed and sonicated, then a Nafion® solution was added and sonicated, and finally the carrier polymer PEO was added and the ink was mechanically mixed. The viscosity of this ink remained constant (high) over time with stirring, indicating no PEO decomposition, and nanofibers could be electro spun. In this exemplary example, the cathode fiber electrospinning conditions with a Johnson-Matthey Pt/C are: the spinneret-to-collector distance being about 25 cm; the applied voltage being about 8.15 kV; the solution flow rate being about 0.7 mL/hour; the relative humidity being about 30% RH; and the temperature being about 23° C.

The composition of the nanofibers in a cathode mat was about 55/35/10 wt % (Pt/C)/Nafion®/PEO. It should be noted that the concentration of PEO in these fibers is less than the normal PAA concentration in the (Pt/C)/Nafion®/PAA fibers, which is typically about 15-23 wt % of PAA and no fibers could be electrospun with only 10 wt %, or less, of PAA. After soaking a fiber mat in water, it was found that essentially all of the PEO carrier polymer dissolved out of the fibers, thus the final fiber electrode composition was about 61 wt % pt/C and 39 wt % Nafion®.

Figure 3A:
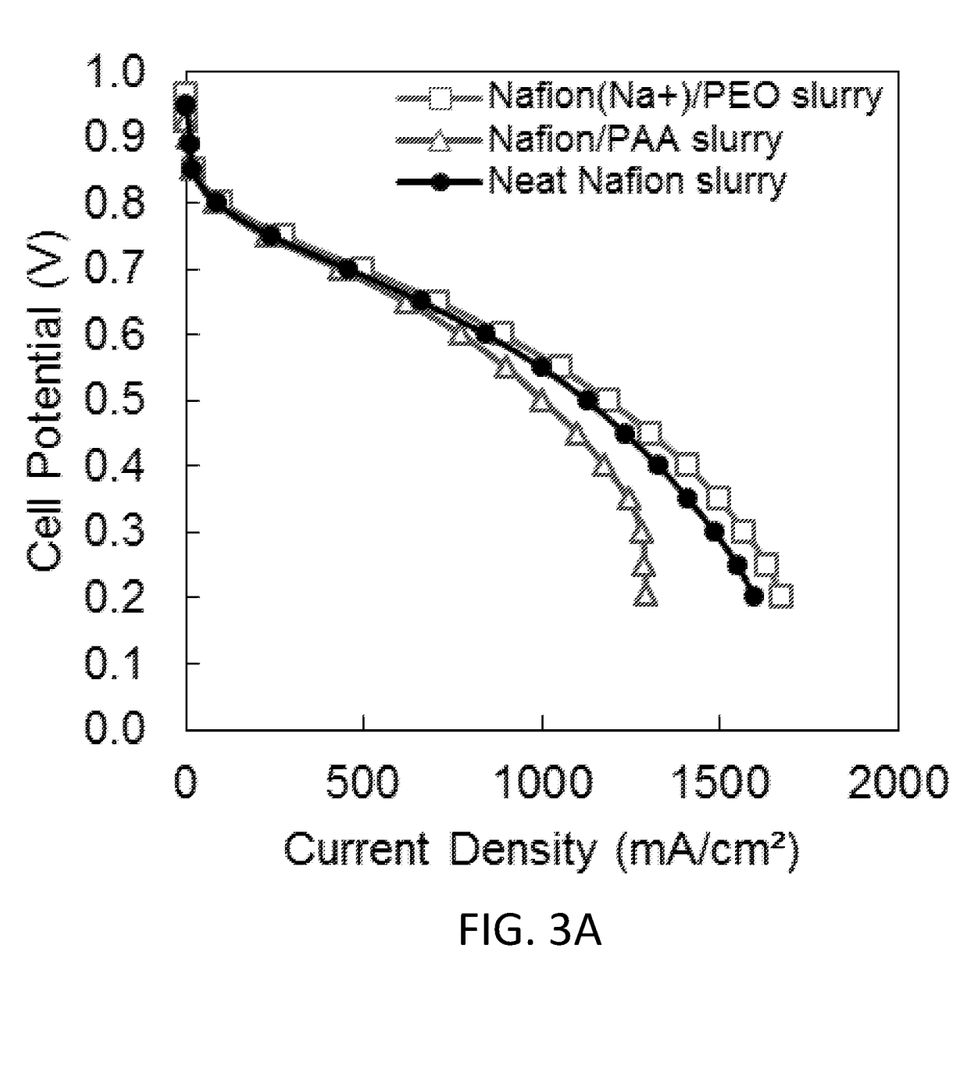
FIG. 3A shows the effect of a binder on performance for painted slurry electrodes, according to one embodiment of the invention, where the Nafion® ($Na^+$)/PEO binder has a better performance than that of the Nafion®/PAA binder.
Figure 3B:
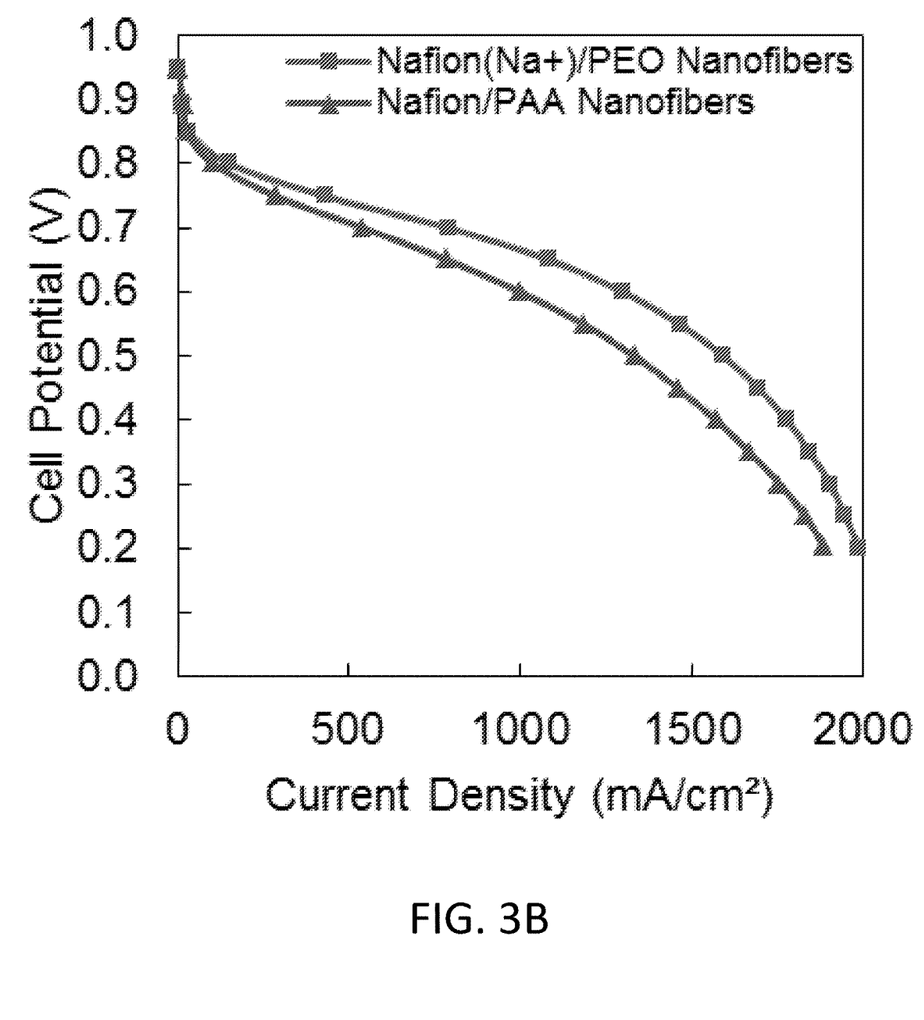
FIG. 3B shows the effect of a binder on performance for nanofiber electrodes, according to one embodiment of the invention, where the Nafion® ($Na^+$)/PEO binder has a better performance than that of the Nafion®/PAA binder.

For characterization of the structural integrity of the fiber mat cathode, a mat sample was placed in a beaker containing 80° C. water; after several hours the fiber mat was intact, i.e., after removing water-soluble PEO, the fibers were structurally sound and did not disintegrate. Next, about 5 cm² membrane-electrode-assemblies (MEAs) were prepared by hot-pressing a nanofiber cathode and a nanofiber anode ((Pt/C)/Nafion®/PAA) onto a Nafion® membrane. After MEA break-in, polarization data were collected at about 80° C., 100% RH, 125/500 sccm $H_2$/air, and 200 kPa absolute pressure. MEAs were also prepared using a slurry cathode with neat Nafion® binder and a slurry cathode with the same ink as the electrospun fibers, i.e., about 55/35/10 wt % (Pt/C)/Nafion®/PEO. FIG. 3A shows the performance of the three slurry-cathode MEAs. As expected, the MEAs with Nafion® or Nafion®/PEO binder worked equally well and much better than the MEA with a cathode binder of Nafion®/PAA, that is the Nafion® ($Na^+$)/PEO binder has a better performance than that of the Nafion®/PAA binder. FIG. 3B shows two nanofiber cathode MEAs: one with the Nafion®/PAA cathode binder and the other with the Nafion®/PEO binder. Similarly, the Nafion® ($Na^+$)/PEO binder has a better performance than that of the Nafion®/PAA binder. As shown in FIG. 3B, the Nafion®/PEO fiber binder worked better, with about 38% improvement in the power density at about 0.65 V. The results from the Nafion®/PEO and Nafion®/PAA binder experiments are listed in Table 1.

TABLE 1

Results from the Nafion ®/PEO and Nafion ®/PAA cathode binder experiments

|  | Power at Max (mW/cm²) | Power at 0.65 V (mW/cm²) |
| --- | --- | --- |
| Neat Nafion ® slurry | 564 | 432 |
| Nafion ®/PAA slurry | 502 | 402 |
| Nafion ®($Na^+$)/PEO slurry | 594 | 462 |
| Nafion ®/PAA nanofibers | 666 | 510 |
| Nafion ®($Na^+$)/PEO nanofibers | 804 | 704 |

The Nafion®/PEO binder results are very promising and could be repeated in duplicate fiber spinning and fuel cell test. Additionally, high fuel cell power output was achieved by using the same (Pt/C)/Nafion®/PEO fiber mats for both the anode and cathode. In certain embodiments, MEA characterization experiments are carried out, where different catalyst/Nafion®/PEO weight ratios in fiber cathodes and/or anodes are examined, where the catalyst content is about 50-55 wt %, the PFSA content is about 25-37 wt %, and the PEO (uncharged polymer) content is about 8-15 wt %. This PEO content is the content before soaking the fibers in a water and/or acid solution. After fiber soaking, the PEO carrier polymer is essentially removed from the fibers, thus the final fiber electrode composition is about 50-70 wt % catalyst particles and 30-50 wt % Nafion (or some other PFSA polymer). In certain embodiments, the Pt/C catalyst is replaced with TKK (Tanaka Kikinzoku Kogyo) PtCo/C and PtNi/C for fuel cell cathodes. In the initial experiments, the cathode fiber mats were not pre-treated in water to remove PEO, nor was there any attempt to remove $Na^+$ counter-ions. It was thought that the $Na^+$ ions would migrate to the cathode during MEA break-in and either accumulate in the cathode or be removed with product water. In certain embodiments, nanofiber electrodes are pretreated either before or after hot-pressing onto a Nafion® membrane, where pretreatment involves soaking in water to remove PEO and/or soaking in an aqueous acid solution to exchange $H^+$ for $Na^+$ while removing/dissolving/decomposing PEO.

Electrospun Fiber Cathodes and Anodes with Binder of 725 EW PFSA and PEO

Figure 4:
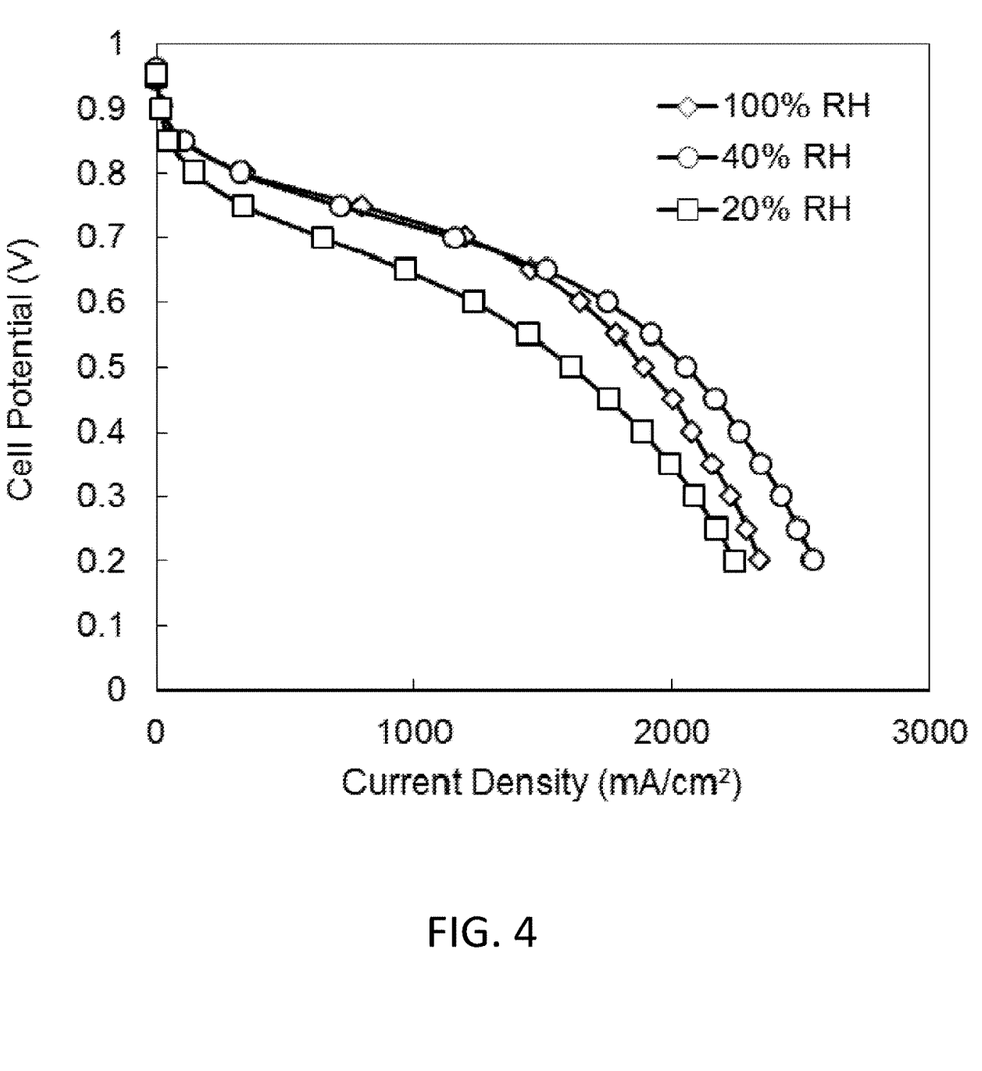
FIG. 4 shows $H_2$/air fuel cell polarization curves for an MEA with an electrospun nanofiber anode made from a (Pt/C)/725 EW PFSA/PEO ink and an electrospun nanofiber cathode made from a (PtCo/C)/Nafion/PEO ink. The membrane was made by dual fiber electrospinning with a composition of 80 wt % 725 EW PFSA with 20 wt % PVDF reinforcing nanofibers. The fuel cell operating conditions are 80 C, 200 kPa (absolute pressure), and 125/500 sccm $H_2$/air.

In this example, a $H_2$/air fuel cell MEA was fabricated using electrospun nanofiber mat anodes and cathodes, where the electrospinning solution for the anode contained 725 equivalent weight (EW) PFSA in the $Na^+$ counterion form ($Na^+$ exchange for $H^+$) and PEO and the cathode binder was 1100 EW Nafion in the $Na^+$ form and PEO. The anode catalyst was Pt/C and the cathode catalyst was PtCo/C. The anode ink composition was 53/36/11 wt % (Pt/C)/(725 PFSA)/PEO and the cathode ink composition was 53/36/11 wt % (PtCo/C)/Nafion/PEO. The membrane was made by dual fiber electrospinning, with a composition of 80 wt % 725 EW PFSA and 20 wt % PVDF (the PVDF are in fiber form and act as a reinforcing mat to strengthen the membrane). The anode and cathode catalyst loading were each 0.10 $mg_{Pt}$/cm². The mats were soaked in hot water to remove PEO carrier polymers and then they were used in the construction of the MEA. The MEA was tested in a fuel cell at the following conditions: 80 C, 200 kPa (absolute pressure), 125/500 sccm $H_2$/air, and a feed gas relative humidity that was set between 20 and 100%. Cell potential (voltage) vs. current density polarization curves for three different feed gas humidities are shown in FIG. 4, where $H_2$/air fuel cell polarization curves for an MEA with an electrospun nanofiber anode made from a (Pt/C)/725 EW PFSA/PEO ink and an electrospun nanofiber cathode made from a (PtCo/C)/Nafion/PEO ink. The membrane was made by dual fiber electrospinning with a composition of 80 wt % 725 EW PFSA with 20 wt % PVDF reinforcing nanofibers. The fuel cell operating conditions are 80 C, 200 kPa (absolute pressure), and 125/500 sccm $H_2$/air.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in the description of this invention are incorporated herein by reference in their entireties and to the same extent as if each reference was individually incorporated by reference.

What is claimed is:

1. A method of forming a fiber electrode for an electrochemical device, comprising:
   forming a liquid mixture containing a catalyst, a first polymer of perfluorosulfonic acid (PFSA) and a second polymer of polyethylene oxide (PEO), wherein the first polymer of PFSA is pre-treated with a salt to exchange protons in the first polymer so that the PFSA is in its salt form and
   electrospinning the liquid mixture to generate electrospun fibers and deposit the generated fibers on a collector substrate to form a fiber electrode comprising a network of fibers, wherein each fiber has a plurality of particles of the catalyst distributed thereon.

2. The method of claim 1, wherein the catalyst comprises platinum (Pt) particles, Pt alloy particles, Pt on carbon particles, Pt alloy on carbon particles, silver (Ag) particles, Ag alloy particles, nickel (Ni) particles, Ni alloy particles, iron (Fe) particles, Fe alloy particles, palladium (Pd) particles, Pd alloy particles, core-shell catalyst particles, non-Pt group metal (PGM) fuel cell catalysts, or a combination thereof.

3. The method of claim 2, wherein the catalyst comprises Pt/C, PtCo/C, or PtNi/C.

4. The method of claim 1, wherein the first polymer of PFSA is pre-treated by soaking dry PFSA powders in an aqueous alkali metal chloride solution or a alkaline earth cation slat solution, or a multivalent cation salt solution for a period of time followed by numerous washings with DI water during filtration, and then polymer drying.

5. The method of claim 1, wherein the PFSA polymer is Nafion® (1100 EW PFSA) or Aquivion® or a low (725) EW PFSA.

6. The method of claim 1, wherein ratios between the catalyst, the first polymer and the second polymer in the fiber electrode are about 55:35:10 wt %, or 53:36:11 wt %.

7. The method of claim 1, further comprising soaking the fiber electrode in water to remove PEO and/or in an aqueous acid solution to exchange $H^+$ for cations while removing/dissolving/decomposing PEO.

8. A method of forming a fiber electrode for an electrochemical device, comprising:
   forming a liquid mixture containing a catalyst, a first polymer and a second polymer; wherein the first polymer is pre-treated to exchange protons in the first polymer with alkali metal, alkaline earth, ammonium, or multivalent cations; and
   electrospinning the liquid mixture to generate electrospun fibers and deposit the generated fibers on a collector substrate to form a fiber electrode comprising a network of fibers, wherein each fiber has a plurality of particles of the catalyst distributed thereon.

9. The method of claim 8, wherein the catalyst comprises platinum (Pt) particles, Pt alloy particles, Pt on carbon particles, Pt alloy on carbon particles, silver (Ag) particles, Ag alloy particles, nickel (Ni) particles, Ni alloy particles, iron (Fe) particles, Fe alloy particles, palladium (Pd) particles, Pd alloy particles, core-shell catalyst particles, non-Pt group metal (PGM) fuel cell catalysts, or a combination thereof.

10. The method of claim 9, wherein the catalyst comprises Pt/C, PtCo/C, or PtNi/C.

11. The method of claim 8, wherein the first polymer comprises perfluorosulfonic acid (PFSA), and is pre-treated by soaking dry PFSA powders in an aqueous alkali metal chloride solution or a alkaline earth cation slat solution, or a multivalent cation salt solution for a period of time followed by numerous washings with DI water during filtration, and then polymer drying.

12. The method of claim 11, wherein the PFSA polymer is Nafion or Aquivion® or 725 EW PFSA.

13. The method of claim 8, wherein the second polymer comprises an oligomer or polymer of ethylene oxide including polyethylene glycol (PEG), polyethylene oxide (PEO), or polyoxyethylene (POE) or some other uncharged polymer such as polyvinyl alcohol (PVA) or polyvinylpyrrolidone (PVP).

14. The method of claim 8, wherein ratios between the catalyst, the first polymer and the second polymer in the fiber electrode are about 55:35:10 wt %, or 53:36:11 wt %.

15. The method of claim 8, further comprising soaking the fiber electrode in water to remove the second polymer and/or in an aqueous acid solution to exchange $H^+$ for cations while removing/decomposing the second polymer.

* * * * *